E. LITTMAN.
MACHINE FOR MAKING PLAITED PAPER.
APPLICATION FILED AUG. 19, 1915.
1,233,377.
Patented July 17, 1917.
4 SHEETS—SHEET 1.
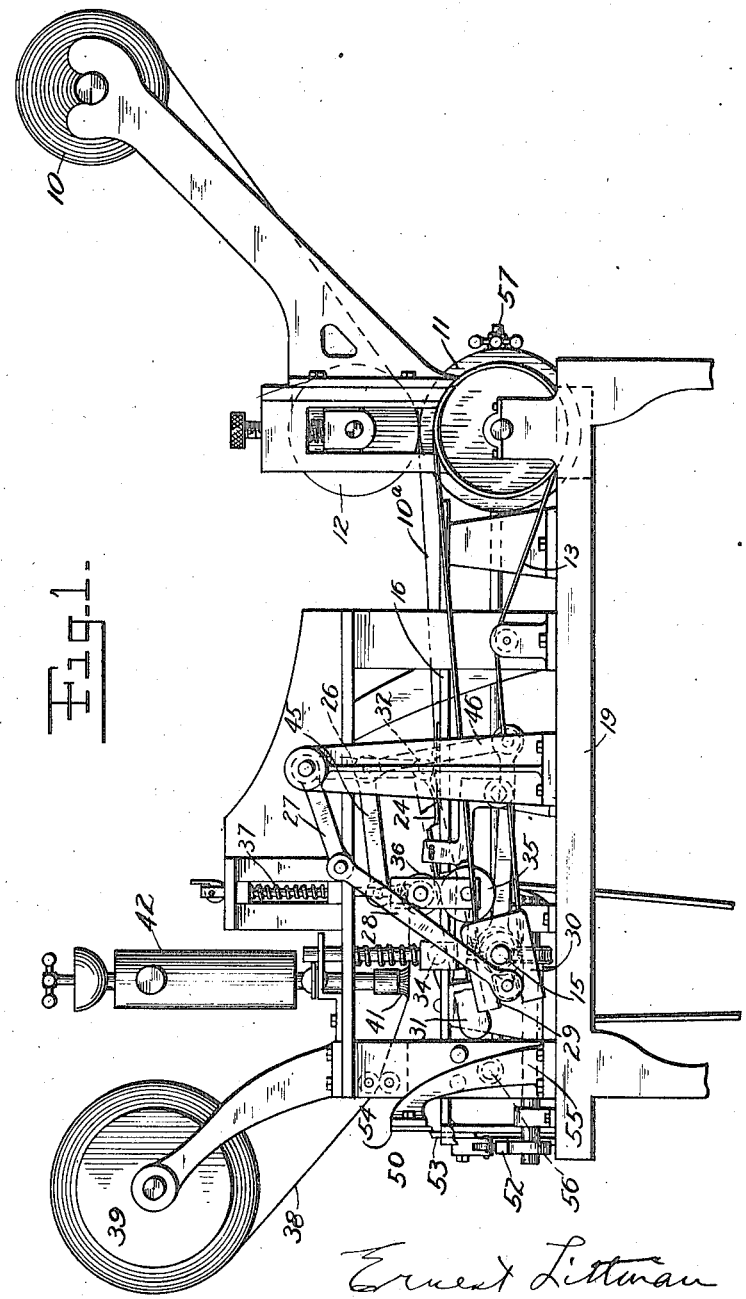

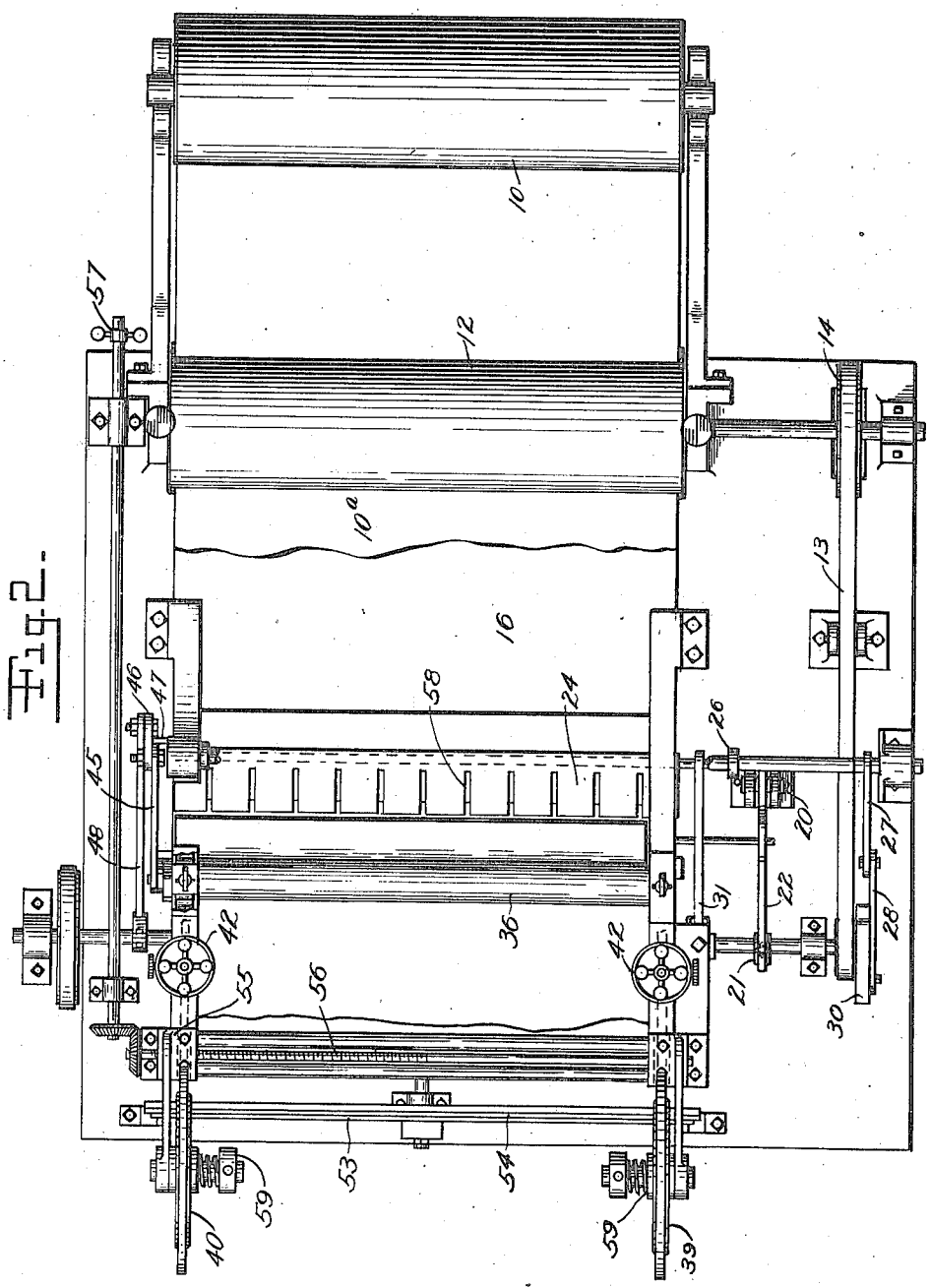

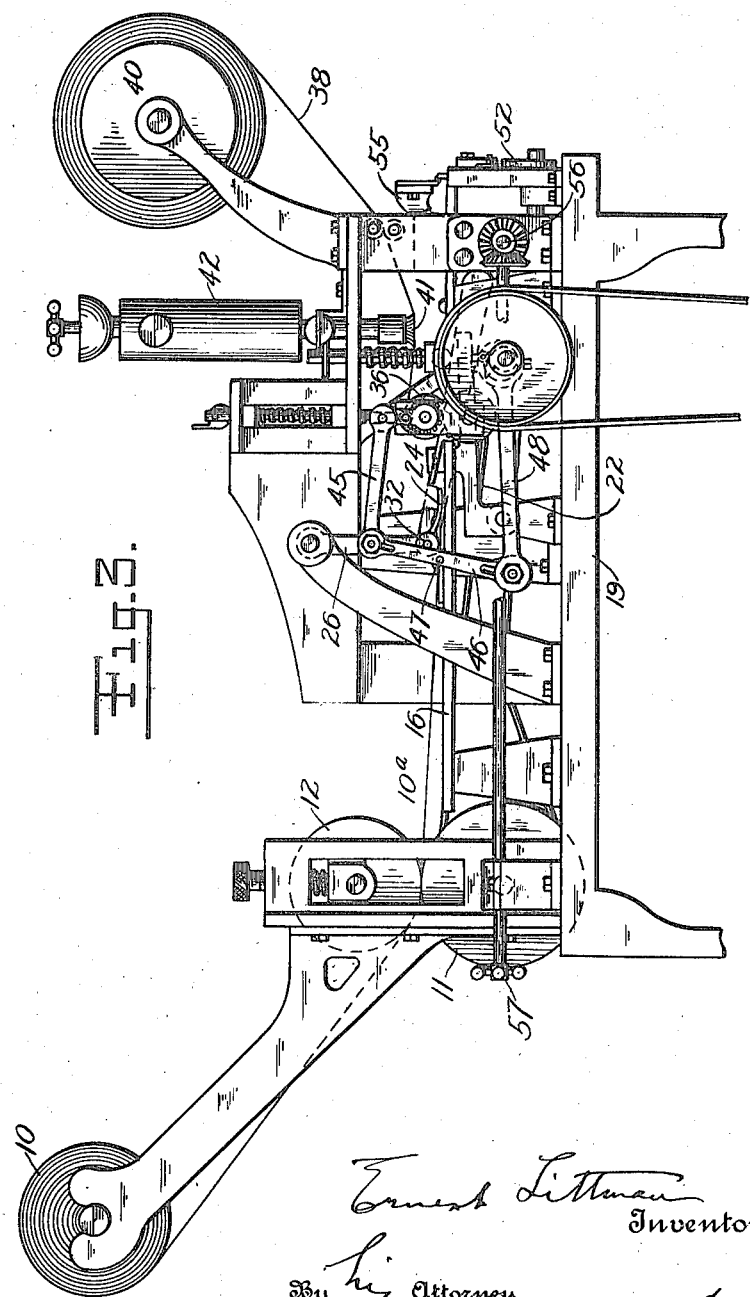

E. LITTMAN.
MACHINE FOR MAKING PLAITED PAPER.
APPLICATION FILED AUG. 19, 1915.
1,233,377.
Patented July 17, 1917.
4 SHEETS—SHEET 4.
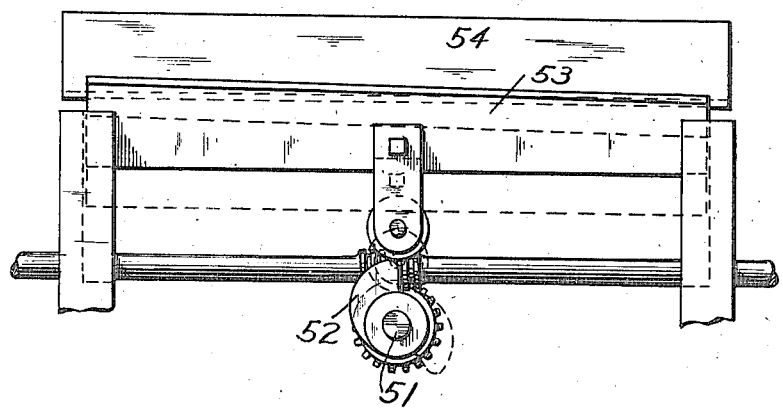
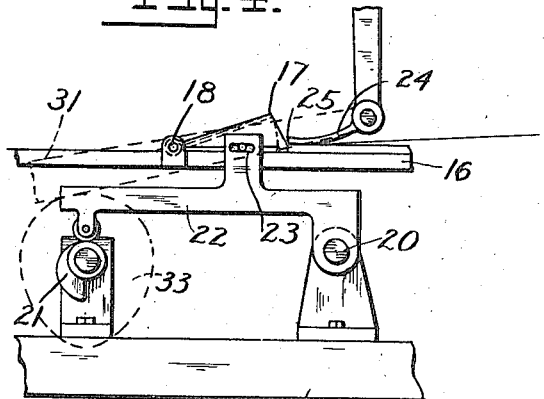
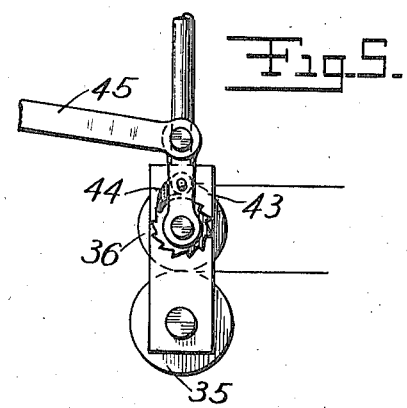
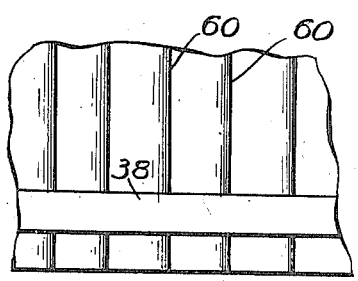
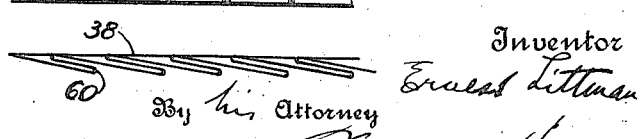

UNITED STATES PATENT OFFICE.

ERNEST LITTMAN, OF NEW YORK, N. Y., ASSIGNOR OF ONE-HALF TO HERBERT M. FRIEDLANDER, OF NEW YORK, N. Y.

MACHINE FOR MAKING PLAITED PAPER.

1,233,377.      Specification of Letters Patent.      Patented July 17, 1917.

Application filed August 19, 1915. Serial No. 46,326.

*To all whom it may concern:*

Be it known that I, ERNEST LITTMAN, a subject of the Emperor of Austria-Hungary, residing at the borough of Manhattan, in the county of New York, city and State of New York, have invented certain new and useful Improvements in Machines for Making Plaited Paper, of which the following is a specification.

This invention relates to a machine for forming ornamental paper, and in the present embodiment the invention is applied to a machine for forming tucked or plaited paper.

A principal object of the invention is to produce an automatic machine capable of producing a neat ornamental paper and capable of operating at a high speed.

One of the objects is to produce such a machine which shall be capable of producing what is known as plaited or tucked paper in large quantities and with the machine operating at a high speed, without tearing the paper.

Further objects of the invention will appear more fully hereinafter.

The invention consists of the general combination of parts and details hereinafter described all of which contribute to produce an effective machine for producing ornamental paper.

A preferred embodiment of my invention will be described in the following specification while the broad scope of the invention will be pointed out in the appended claims.

In the drawing:—Figure 1 is a side elevation of a machine embodying my invention, partly broken away. Fig. 2 is a plan of the machine. Fig. 3 is an elevation showing the opposite side from that shown in Fig. 1. Fig. 4 is a fragmentary side elevation and partial section showing details of the tucker device. Fig. 5 is a side elevation showing other details. Fig. 6 is an elevation showing details of the knife. Fig. 7 is a plan showing a small portion of paper such as produced by the machine. Fig. 8 is an edge view of a portion of the finished paper.

The paper stock is preferably drawn from a supply roll 10 in a continuous web 10ª passing between guide means such as guide and feed rollers 11 and 12 the former of which may be continuously driven at a slow speed by a suitable belt 13 passing around a suitable pulley 14 on the shaft of roller 11 and driven from the main shaft 15.

The tucks are preferably formed by displacing transverse portions of the sheet laterally progressively to develop in excess of the material then operating upon this displaced portion to form a double edge and then pressing the doubled edges to form the tucks, meanwhile the paper is preferably feeding forward intermittently.

In order to accomplish this I prefer to guide the paper web 13 along the upper face of a substantially horizontal table 16. Near the upper face of the table I provide means such as a pusher or shoe 17 preferably pivoted at 18 and continuously rocked or reciprocated laterally with respect to the plane of the paper. In other words the paper passes over the shoe and every time the shoe moves down it leaves a displaced portion or pocket of the material. The shoe 17 is preferably reciprocated by means of a rocking frame 22 pivotally supported on the frame 19 of the machine at 20 and also supported on a continuously rotating cam 21 which lets the pusher drop suddenly at each revolution. The pusher may be connected with the frame 22 by a pin and slot connection 23. While the displaced pocket of the material is projecting up from the sheet it is engaged by a tucker device preferably comprising a plate 24 disposed above the sheet near the table; the forward edge 25 of this tucker engages the displaced part of the sheet and moves forward at this point in the direction in which the sheet is moving. The upper part of the displaced portion then falls in the pusher and forms a doubled edge extending transversely across the sheet. In order to reciprocate the tucker I prefer to mount it on an arm 26 of a bell crank lever 27 rocked by a link 28 adjustably attached in a radial slot 29 in a crank disk 30 on the aforesaid shaft 15.

Means is provided for holding the tucker off of the sheet on the back stroke of the tucker preferably consisting of an arm 31 having a common pivot support at 32 with the tucker plate, a cam 33 on shaft 15 engages the under side of arm 31 and holds it and the tucker plate up as the tucker recedes. A spring-pressed block and roller 34 hold the arm 31 down on the cam.

The means for pressing the doubled edges to form them into tucks preferably comprises two rollers 35 and 36 rotatably mounted one above the other, the roller 36 being pressed by a spring 37 down on to roller 35. The web 10ª passes between these rollers which press the doubled edges or folds flat. In order to permanently hold the tucks in place I prefer to provide a tape or tapes 38 which pass down from supply rolls 39 and 40. These tapes are preferably dry-gummed tapes, and as they pass down the gummed face is moistened by suitable fountain brushes 41 supplied constantly with water from a reservoir 42. These tapes are thus rendered adhesive on one face and they then pass over the roller 36 and between it and roller 35. This presses the adhesive side of the tapes against the tucks which secures them in place. In order to feed the paper intermittently forward I prefer to intermittently rotate the rollers 35 and 36. This is preferably accomplished by means of a ratchet and pawl 43 and 44, the pawl mounted on an arm which is constantly rocked by a link 45 (see Fig. 3), said link being actuated by a rock lever 46 pivoted at 47 and constantly rocked by an eccentric rod 48 from shaft 15. The spring 37 is provided with a suitable let-off device 49 for holding the roller 36 raised when desired.

After leaving the rollers 35 and 36 the paper moves past a knife 50 which is operated automatically to cut the web into suitable lengths. For this purpose I prefer to provide a countershaft 51 (see Fig. 6), driven from shaft 15 and carrying a cam 52 which intermittently raises the lower blade 53 to coöperate with the upper blade 54 like shears.

In order to adapt the tape rolls 39 and 40 to the making of different widths of tucked paper I prefer to mount the roller 40 on a sliding bracket 55 which is adjustable transversely of the machine because it has threaded engagement with a transverse adjusting screw 56. This screw can be rotated from hand-wheel 57 (see Fig. 2).

The tucker plate is preferably formed with slots 58 on its forward edge.

In order to maintain the tapes in suitable tension the rollers 39 and 40 are preferably provided with spring-pressed frictional tension devices 59 at their hubs.

In Figs. 7 and 8, 60 represents the tucks which are held in place by the continuous tape 38 running near each edge of the sheet.

It is understood that the embodiment of the invention described herein is only one of the many embodiments my invention may take and I do not wish to be limited in the practice of my invention nor in my claims to the particular embodiment described.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. In a machine for forming tucked paper, in combination, a table on which the sheet lies, a reciprocating pusher moving up and down near the surface of the table to displace the paper upwardly into a transverse pocket, a reciprocating tucker consisting of a plate projecting in the direction the paper advances and engaging said pocket with its edge to form a doubled transverse edge in the paper, and rollers for pressing the doubled edges to form tucks and means for supplying a tape passing between said rollers to adhere to the tucks of said sheet, and means for intermittently rotating said rollers to feed the sheet forward.

2. In a machine for forming tucked paper, in combination, means for forming transverse tucks in the sheet, means for holding and attaching binding tapes to the paper, and means for adjusting the holding means for the tapes to adapt the same to sheets of different width.

3. In a machine for forming tucked paper, in combination, means for forming transverse tucks in the sheet, a supply roll for a tape, means for drawing the tape from the roll and for attaching the same to the sheet, a bracket carrying the said roll, and a transverse adjusting screw engaging said bracket for adjusting the same across the machine.

4. In a machine for forming tucked paper, in combination, means for forming transverse tucks in the sheet, a supply roll for a tape, means for drawing the tape from the roll and for attaching the same to the sheet, a bracket carrying the said roll, a transverse adjusting screw engaging said bracket for adjusting the same across the machine, a knife, and means for automatically actuating the same to cut the sheet into smaller sheets.

In testimony whereof I affix my signature.

ERNEST LITTMAN.